(12) United States Patent
Johnson et al.

(10) Patent No.: US 12,536,518 B2
(45) Date of Patent: Jan. 27, 2026

(54) MODULAR TRANSACTION TERMINAL ARCHITECTURE

(71) Applicant: NCR Voyix Corporation, Atlanta, GA (US)

(72) Inventors: Mark Christopher Johnson, Lawrenceville, GA (US); Ajit Chetty Cotha, Brookhaven, GA (US); Terry Jendon, Dawsonville, GA (US); Carl Richard Snezek, Jr., Suwanee, GA (US)

(73) Assignee: NCR Voyix Corporation, Atlanta, GA (US)

( * ) Notice: Subject to any disclaimer, the term of this patent is extended or adjusted under 35 U.S.C. 154(b) by 426 days.

(21) Appl. No.: 18/088,863

(22) Filed: Dec. 27, 2022

(65) Prior Publication Data

US 2024/0211912 A1 Jun. 27, 2024

(51) Int. Cl.
*G06Q 20/18* (2012.01)
*G06F 13/10* (2006.01)
*G06Q 20/20* (2012.01)

(52) U.S. Cl.
CPC ........... *G06Q 20/18* (2013.01); *G06F 13/102* (2013.01); *G06Q 20/204* (2013.01)

(58) Field of Classification Search
CPC ..... G06Q 20/18; G06Q 20/204; G06F 13/102
See application file for complete search history.

(56) References Cited

U.S. PATENT DOCUMENTS

2017/0192930 A1* 7/2017 Mckibben ............... H04L 12/44
2021/0011517 A1* 1/2021 Murdoch ............... G06Q 20/18

FOREIGN PATENT DOCUMENTS

EP 3422310 A1 * 1/2019 ............... G07G 1/12

* cited by examiner

*Primary Examiner* — A. Hunter Wilder
*Assistant Examiner* — Joseph M Mutschler
(74) *Attorney, Agent, or Firm* — Schwegman Lundberg & Woessner, PA.

(57) ABSTRACT

A first host device housing is provided with a host device and first peripherals. The host device includes a motherboard and an upper core Input/Output (I/O) control board connected to the motherboard within the host device housing. A non-host device housing includes second peripherals and a lower core I/O control board. The host device housing is removably attachable to the non-host device housing to form a modular terminal. The second peripherals are interfaced to the host device through a cable that connects the lower core I/O control board to the upper core I/O control board. Combinations of the host device housing and a selected non-host device housing form different configurations of a modular terminal. Features available to a given configuration of the modular terminal are driven by the first peripherals and the second peripherals.

18 Claims, 9 Drawing Sheets

UPPER CORE I/O BOARD

FIG. 7A

LOWER CORE I/O BOARD

FIG. 9

MODULAR TRANSACTION TERMINAL ARCHITECTURE

BACKGROUND

Prior to recent advances in the retail industry, a retailer who desired a transaction terminal had few options available from manufacturers. The terminals had a large physical footprint and came equipped with many features that the retailer did not want or need.

Recent advancements in the industry now permit a retailer to purchase different configurations of terminals based on their individual needs. The terminal peripherals are housed in combinations with one another within housings and the housings can be connected to achieve a customer-configured terminal with a set of features desired by a given retailer.

However, properly setting up the configurations remains a challenge for the retailers. The peripherals in the non-host device housings must be connected via cables through the host's device housing to the host device. Technicians can be required for certain configurations and the elapsed time to setup the configurations can significantly surpass the retailer's original expectations both in time and expense.

Because retailers want a small terminal footprint, the housings of the non-host devices and host device's housing are already minimized as much as is currently achievable in the industry. Thus, increasing the size of the housings is not an acceptable solution which retailers are willing to consider for purposes of decreasing the complexity and labor associated with achieving desired configurations.

SUMMARY

In various embodiments, terminal devices and a system with a modular architecture are presented. A host device housing includes a host device, first peripheral devices, and an upper core Input/Output (I/O) control board connected to a motherboard of the host device. Multiple non-host device housings are provided. Each non-host device housing includes one or more second peripherals and a lower core I/O control board. The lower core I/O board is connected via a cable to the upper core I/O control board to interface the one or more second peripherals to the motherboard of the host device within the host device housing and the corresponding non-host device housing. The host device housing is attachable to and detachable from different non-host device housings, which include different combinations of the one or more second peripherals. A combination of the host device housing with a certain non-host device housing forms a configuration of a modular terminal. Any given configuration of the modular terminal can be operated by a customer or a cashier as a self-service terminal, a point-of-sale terminal, a kiosk, or an automated teller machine. Each given configuration provides its own a unique set of transaction capabilities to the operator of the terminal through the first peripherals and the connected second peripherals.

DETAILED DESCRIPTION

A terminal configuration is a trade-off between peripherals included within the host device's housing and the peripherals included within housings of the non-host devices. A challenge that presents itself with respect to connectivity of a peripheral to the host device is reducing/minimizing the number of cabled connections required between the host device housing and the non-host device housings. Each peripheral provides a unique set of capabilities to the terminal and adding more peripherals typically requires both increasing the size of the housings and increasing the number of cables that need to be passed between the housings of the non-host devices and the host device housing.

The teachings provided herein address these technical problems by providing a technical solution that includes a modular terminal architecture that reduces a total number of cabled connections required between a host device housing and the housings of the non-host devices. Peripherals can be added or removed from a modular terminal configuration without increasing the cabled connections between the host device housing and the non-host device housings.

As used herein a "terminal" is a device that includes a host device and a variety of peripheral devices (hereinafter simply "peripherals"). A "host device housing" includes the host device and a first subset of peripherals for the terminal. A "hon-host device housing" includes a second subset of peripherals for the terminal. A given peripheral can have its own independent housing that is attached to and removed from the host device housing and/or a non-host device housing.

A "modular terminal" is a terminal that can be configured using the host device housing with a plurality of different non-host device housings and/or independent housings so as to include different combinations of peripherals, and accordingly, different capabilities of the terminal. A modular terminal can be operated in different modes of operation. For example, the modular terminal can be operated as a self-service terminal (SST), a point-of-sale (POS) terminal, or an automated teller machine (ATM).

Figure 1:
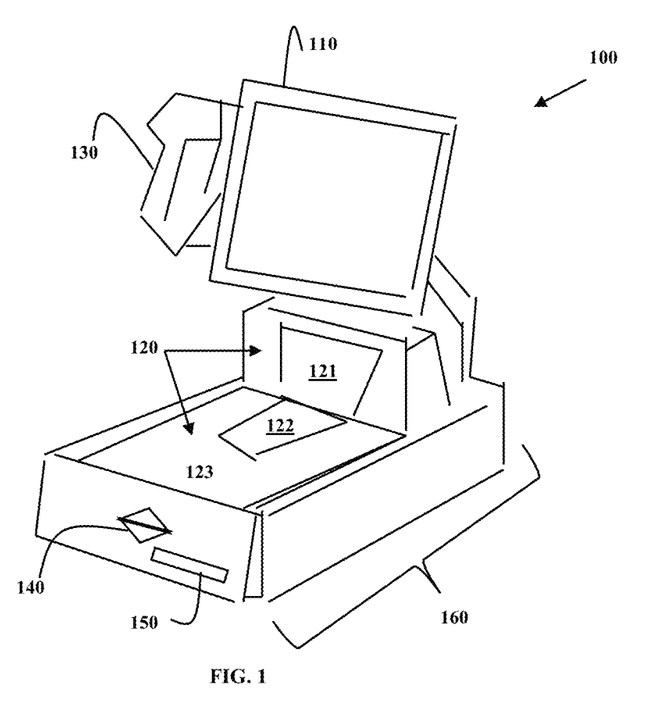
FIG. 1 is a diagram of a host terminal, according to an example embodiment.

FIG. 1 is a diagram of a host terminal 100, according to an example embodiment. The host terminal 100 includes a host device 810-1 encased within a host device 810-2 housing (shown in FIG. 8 below), a touch display 110, a combined scanner and scale 120, an optional handheld scanner 130, a user navigation control 140, and a coupon accepter 150. The combined scanner and scale 120 includes an integrated weigh scale 123 and a bioptic scanner that includes a vertical scan window 121 and a horizontal scan window 122.

The host device 810-1 includes, inter alia, a motherboard 810 and an upper core I/O board 812 situated within the host device housing 810-2 in a location that is behind the touch display peripheral 110 or in any locations within the touch display peripheral housing with respect to the host device 810-1. That is, in an example embodiment, the host device housing 810-2 includes a combined composite housing for a combined scanner scale housing, a handheld scanner housing, and a touch display housing. In an example embodiment, the host device 810-1 is located within the touch display housing of the overall host device housing 810-2. The upper I/O board is discussed in more detail below with reference to FIGS. 7A and 8.

Figure 2:
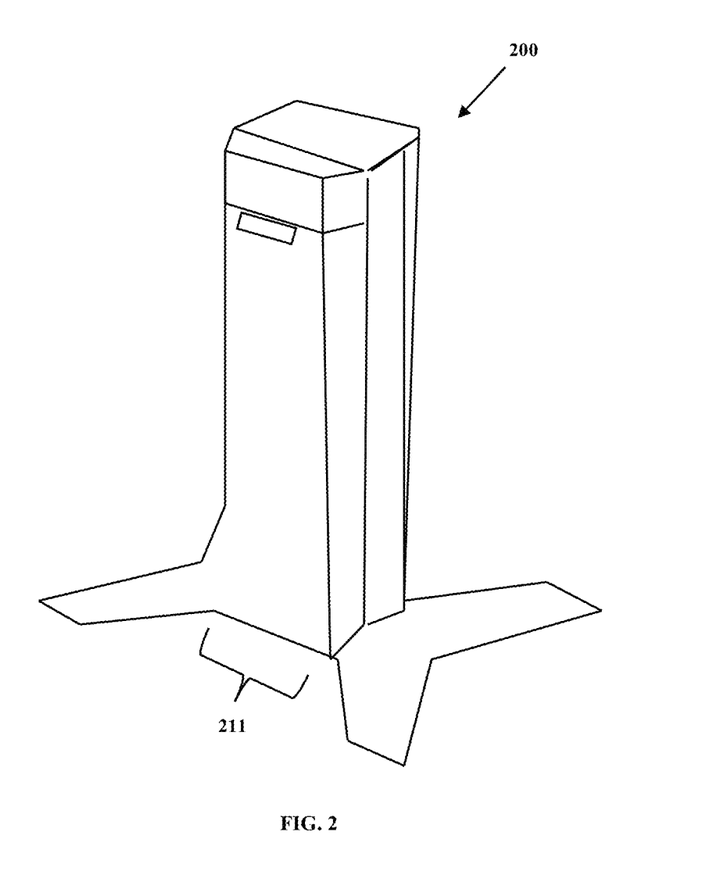
FIG. 2 is a diagram of a first non-host terminal, according to an example embodiment.

A base 160 of host device housing 810-2 is adapted to be attached and secured to a pedestal non-host device 200, shown in FIG. 2. Alternatively, the base 160 is also adapted to be placed partially into and affixed to a countertop of a media depository non-host device 300, shown in FIG. 3, such that a top horizontal surface of scanner 120 is flush with a top surface of media depository non-host device 300.

FIG. 2 is a diagram of a first non-host terminal 200, according to an example embodiment. The first non-host terminal 200 includes a first non-host device 820-1 and a non-host device housing 820-2, shown in FIG. 8. The first non-host device 820-1 is referred to hereinafter as a "pedestal non-host device 820-1."

Pedestal non-host device 820-1 includes a lower core I/O board 821 situated at a bottom and within a housing 820-2 for a base 211 of first non-host terminal 200. The base 211 rests on or can be bolted to a floor, ground, or a horizontal surface. The pedestal non-host device 820-1 can include a handle for moving the pedestal non-host device housing 820-1. However, the pedestal non-host device 820-1 may support a printer peripheral that is attachable to the right or the left of the pedestal non-host device 820-1.

Figure 3:
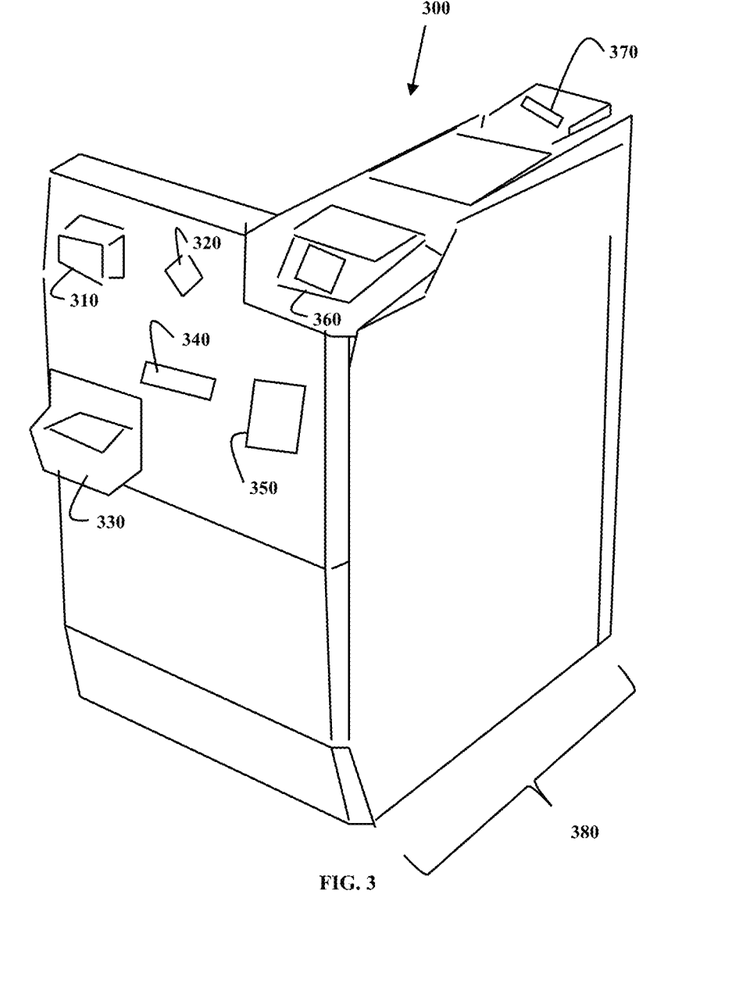
FIG. 3 is a diagram of a second non-host terminal, according to an example embodiment.

FIG. 3 is a diagram of a second non-host terminal 300, according to an example embodiment. The second non-host terminal 300 includes a media depository non-host device 820-1 and a non-host housing 820-2, shown in FIG. 8. The second non-host device 820-1 is referred to as a "media depository non-host device 820-1" hereinafter.

The second non-host terminal 300, which as noted above may be a media depository non-host device 820-1 includes a coin accepter 310, a user navigation control 320, a coin dispenser 330, a coupon accepter 340, a combined currency or note accepter and dispenser 350, a combined keypad and card reader 360, and a receipt printer 370. A base 380 of second non-host terminal 300 rests and is bolted to a floor, ground, and/or horizontal surface. Within non-host device housing 820-2 adjacent to a bottom of base 380, the media depository non-host device 820-1 includes a lower core I/O board 821 (described in more detail with respect to the specific implementation of the lower core I/O board 821 shown in FIG. 7B).

Figure 4:
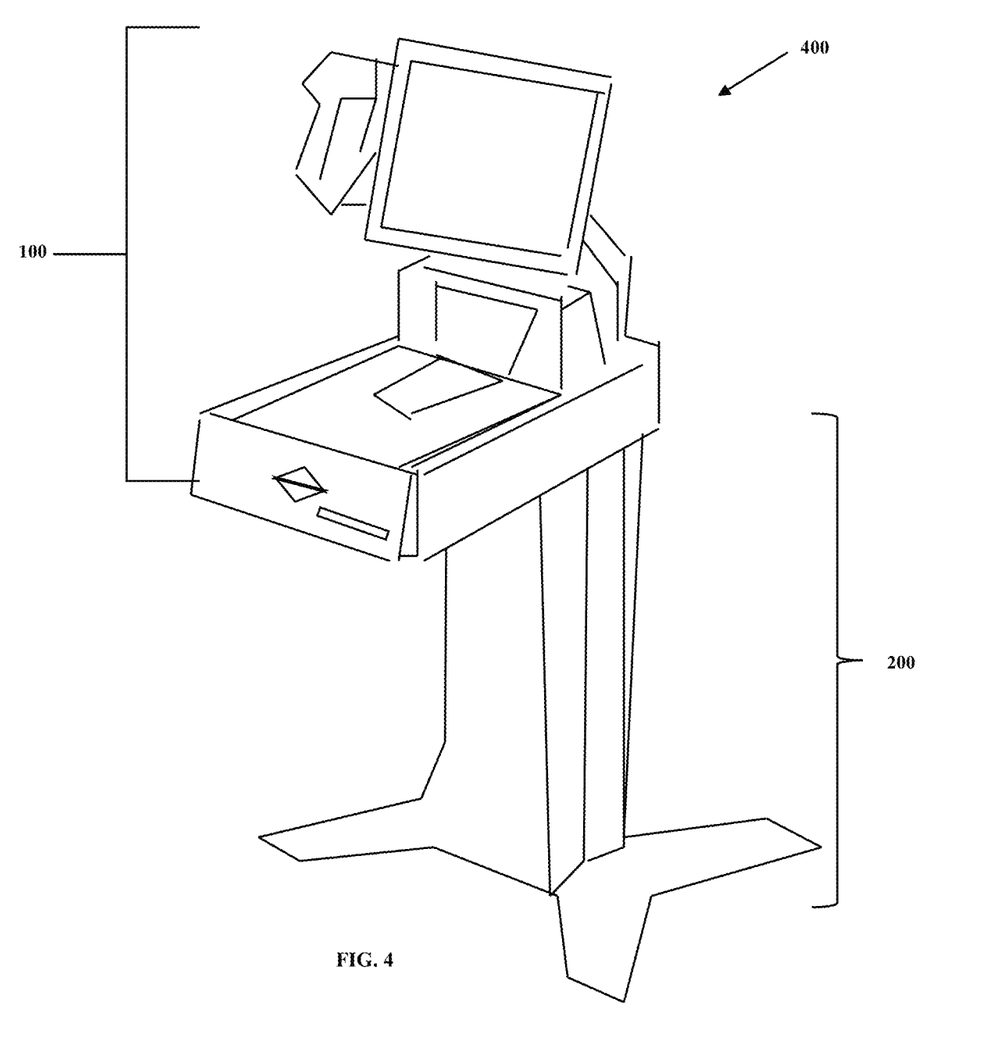
FIG. 4 is a diagram of a modular terminal that includes the host terminal and the first non-host terminal, according to an example embodiment.

FIG. 4 is a diagram of a modular terminal 400 that includes the host terminal 100 (e.g., host device 810-1) and the first non-host terminal 200 (e.g., pedestal non-host device 820-1), according to an example embodiment. Base 160 of host terminal 100 is affixed to a top of first non-host terminal 200 to configure modular terminal 400. Cable connections between host device 810-1 and pedestal non-host device 820-1 are made within the host device housing 810-2 and the pedestal non-host housing 820-2. These connections are discussed in more detail below with reference to FIG. 8.

The modular terminal 400 includes a set of capabilities which are available to an operator of terminal 400 and which are driven by the peripherals available in the configuration shown in FIG. 4. For example, host device 810-1 includes a touch display 110, a combined weigh scale and scanner 120, a handheld scanner 130, a user navigation control 140, and a coupon accepter 150, while pedestal non-host device 820-1 can include an attachable a receipt printer. It is to be noted that the combined keypad and card reader 360 may be removably attachable to the host device housing 810-2 for modular terminal 400 to support (personal identification number) PIN entry and card reading for modular terminal 400.

Thus, once the modular terminal 400 is configured and the cable connections are made, the terminal 400 provides an operator with weighing features, scanning features, touch-input features, user navigation-input features, card-reading features, and printing features.

Figure 5:
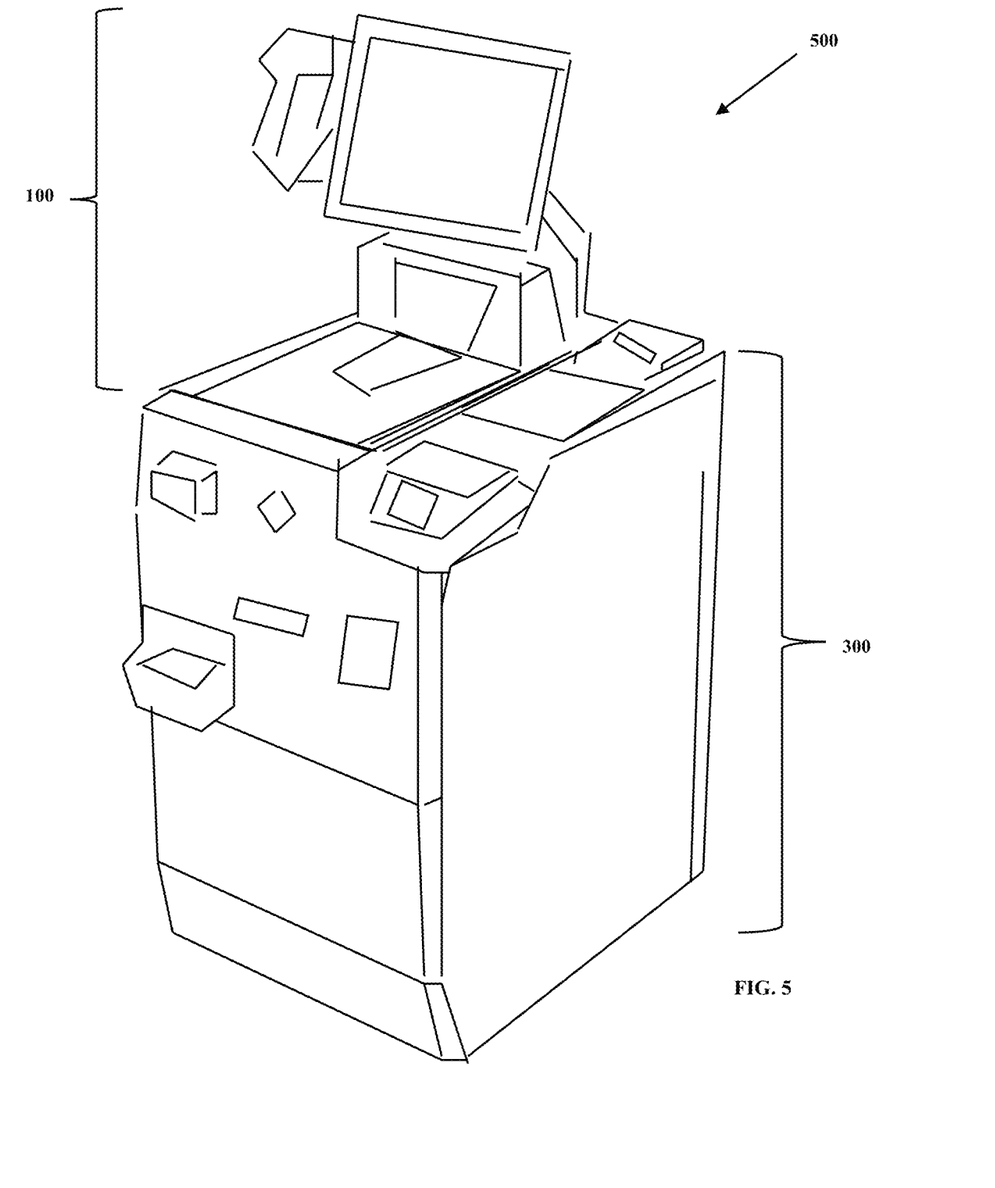
FIG. 5 is a diagram of a modular terminal that includes the host terminal and the second non-host terminal, according to an example embodiment.

FIG. 5 is a diagram of a modular terminal 500 that includes the host terminal 100 (e.g., host device 810-1) and the second non-host terminal 300 (e.g., non-host device 820-1), according to an example embodiment. Base 160 of host terminal 100 is affixed into a recess within a countertop of second non-host terminal 300 to configure modular terminal 500. Cable connections between host device 810-1 and media depository non-host device 820-1 are made within the host device housing 810-2 and media depository non-host device housing 820-2.

The modular terminal 500 includes an expanded set of capabilities which are available to an operator of terminal 500 and which are driven by the peripherals available in the configuration shown in FIG. 5. For example, host device 810-1 includes a touch display, a combined weigh scale and scanner 120, and a handheld scanner 130, while media non-host device 820-1 includes a coupon accepter 310, a user navigation control 320, a coin dispenser 330, a coupon accepter 340, a currency/note accepter and dispenser 350, a combined card reader and keypad/PIN pad 360, and a receipt printer 370. Thus, once modular terminal 500 is configured and the cable connections are made, the terminal 500 provides an operator with weighing features, scanning features, touch-input features, user navigation-input features, coupon features, contactless and contact-based card reading features, PIN entry features, currency deposit and withdrawal features, coin deposit and withdrawal features, and printing features.

Figure 6:
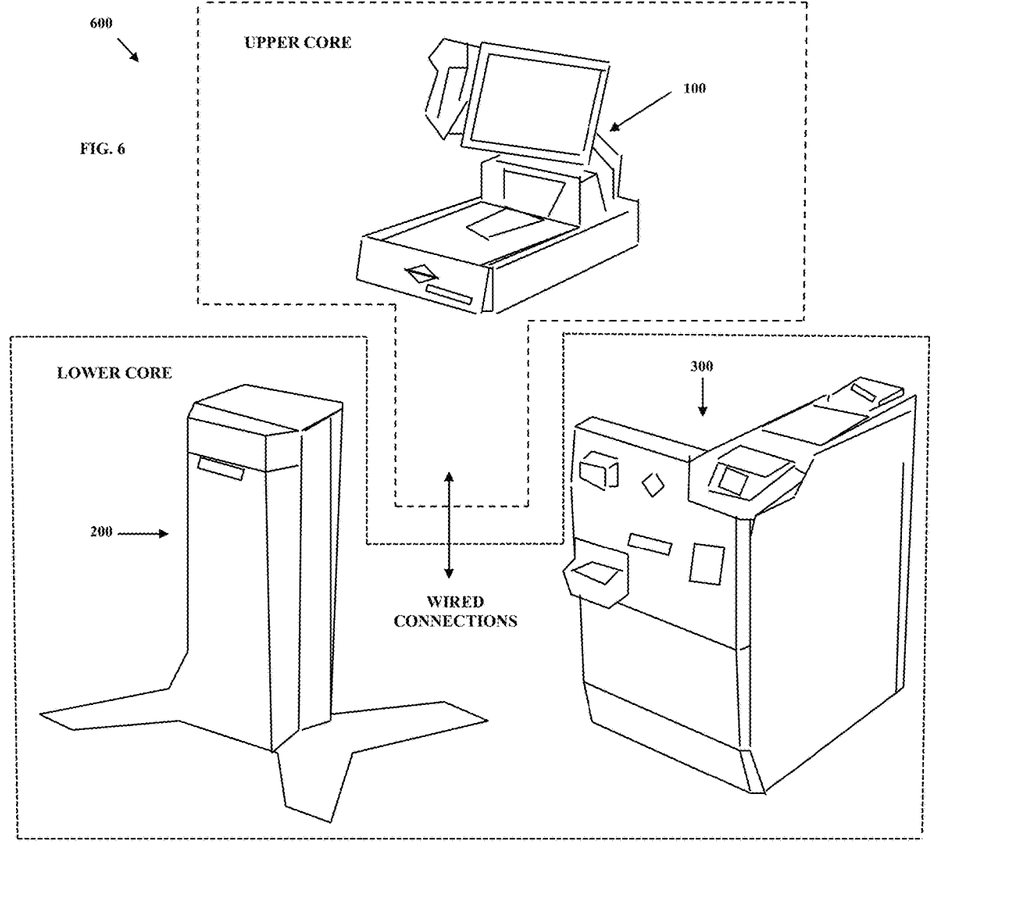
FIG. 6 is a diagram illustrating the wired connectivity between the host terminal with the first non-host terminal and the second-non host terminal, according to an example embodiment.

FIG. 6 is a diagram 600 illustrating the wired connectivity between the host terminal 100 with the first non-host terminal 200 and/or the second-non host terminal 300, according to an example embodiment. Host terminal 100 can be operated in a standalone mode without the first and second non-host terminals 200 and 300. Alternatively, host terminal 100 can be operated, affixed, and connected to first non-host terminal 200 for a first set of operator features. Still further, host terminal 100 can be operated, affixed, and/or connected to second non-host terminal 300 for a second set of operator features. The host terminal 100 is adaptive to be attached, connected, and removed from the non-host terminals 200 and/or 300.

In an embodiment, modular terminal 400 may be referred to as a "card payment terminal 400" when combined card reader and keypad 360 is attached to the host device housing 810-2. In an embodiment, modular terminal 500 may be referred to as a "full-function payment terminal 500."

As discussed above, a challenge in achieving configurations and different modular terminals 400 and/or 500 is the amount of cable connections that need to be made between the peripherals of the non-host device 820-1 and the host device 810-1, within the host device housing 810-2 and the non-host device housing 820-2. Space is limited and comes at a premium because retailers desire smaller footprint terminals. As such, increasing terminal size is not a viable option.

These technical problems are solved herein by providing a redesigned architecture for the terminals, which requires fewer cable connections than what has been previously required. More specifically, as part of the new terminal architecture according to example embodiments of the technology disclosed herein, I/O for the peripherals of the host device 810-1 that previously resided within the non-host device housings 820-2 now reside within the host device housing 810-2. In addition, a redesigned and expanded I/O board is provided to the host device 810-1 and a smaller more specific I/O board is provided to the non-host devices 820-1.

Figure 7A:
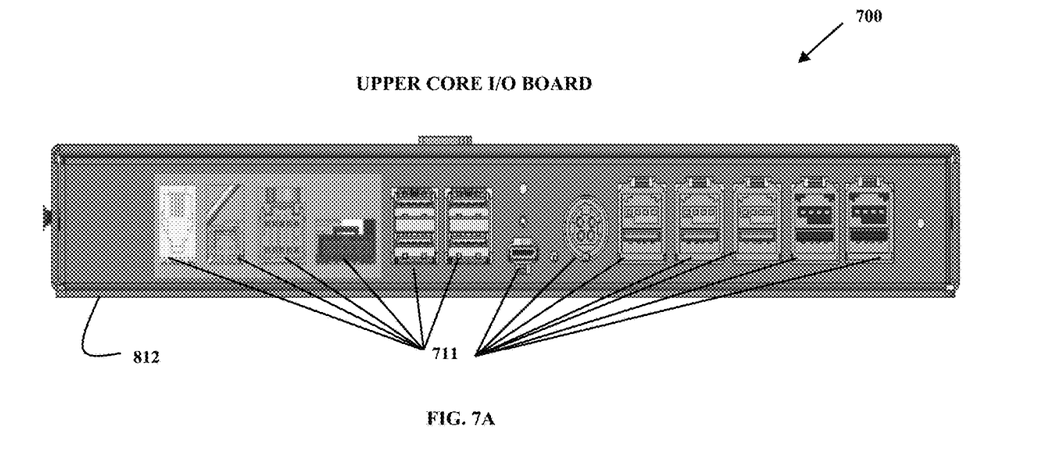
FIG. 7A is a diagram of an Input/Output (I/O) board for a host terminal, according to an example embodiment.

FIG. 7A is a diagram of an Input/Output (I/O) board 812 for a host terminal 100, according to an example embodiment. The I/O board 812 includes a variety of input ports 711 to connect to a motherboard 810 of a host device 810-1. Some of ports 711 connect to peripherals housed within the host device housing 810-2 and some of the ports 711 connect to peripherals or control boards housed in the non-host device housings 820-2.

In an embodiment, the I/O board 812 includes 14 or 15 ports as compared to a previous I/O board that included 13 ports. The 14 ports 711 also are different from the previous I/O board in that they include additional universal serial bus (USB) type ports, a coupon sensor port 711, a proximity sensor port 711, a coupon light emitting diode port 711, and a supervisor switch port 711. In an embodiment, board 812 includes a coupon sensor port 711; a coupon LED port 711; a lift mechanism/proximity sensor port 711; a supervisory switch port 711; a USB type A/B port 711 for the user navigation control 140 or 320, or for universal product symbol (UPS) scanners 120; a power/data port 711; a 24-volt (V) power in port 711; a 24 V direct current input (DIN) port 711; a 12 V USB for LED control in a tower; a 12 V USB port 711 for the handheld scanner 130; a 12 V USB port 711 for PIN pad 360; a 12 V USB port 711 for a single scan window 121 and/or 122; a 24 V USB port 711 for a lane light; and a 24 V USB port 711 for an attachable and detachable printer 370.

Figure 7B:
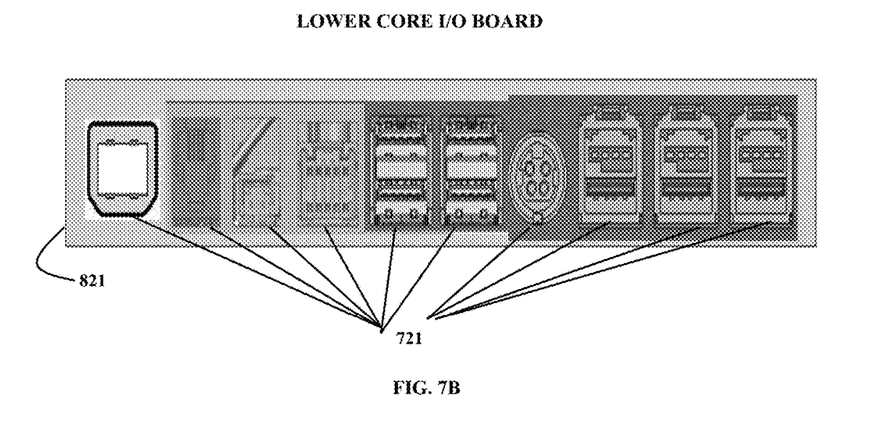
FIG. 7B is a diagram of an I/O board for the first non-host terminal and the second non-host terminal, according to an example embodiment.

FIG. 7B is a diagram of an I/O board 821 for the first non-host terminal 200 and the second non-host terminal 300, according to an example embodiment. The I/O board 821 includes a variety of input ports 821 for controlling I/O of peripherals within the host-device housing 810-2 and peripherals that are natively within the non-host device housing 820-2. In an embodiment, I/O board 821 is an addition to previous architectures which failed to include a dedicated I/O board within a non-host device housing.

In an embodiment, I/O board 821 includes a USB type B host port 721; a coupon sensor port 721; a coupon LED port 721; a lift mechanism/proximity sensor port 721; two USB type A ports 721, one for UPS scanners 120; a 24 V DIN port 721, 2 12 V USB ports 721, one for LED control in the pedestal non-host device 820-2, and one for a Bagwell scale control; and a 24 V USB port 721 for printer 370 or an attachable and detachable printer. In an embodiment, I/O board includes 10 or 12 ports 721.

The architecture with enhanced and revised I/O board 812 for the host device 810 combined with the enhanced and new I/O board 821 in the non-host devices 820 permit the number and complexity of cabled connections between the host device 810 and corresponding non-host device(s) 820 to be reduced within the host device housing 810-2 and the non-host device housing(s) 820-2 from what was previously achievable in the industry. In particular, previously, anywhere from 11 to 15 cables had to be connected between a host device and a non-host device, whereas the architectures presented herein using I/O boards 812 and 820 require, in various embodiments, only 5 cables—representing a reduction of more than half of the number of cables previously required.

Figure 8:
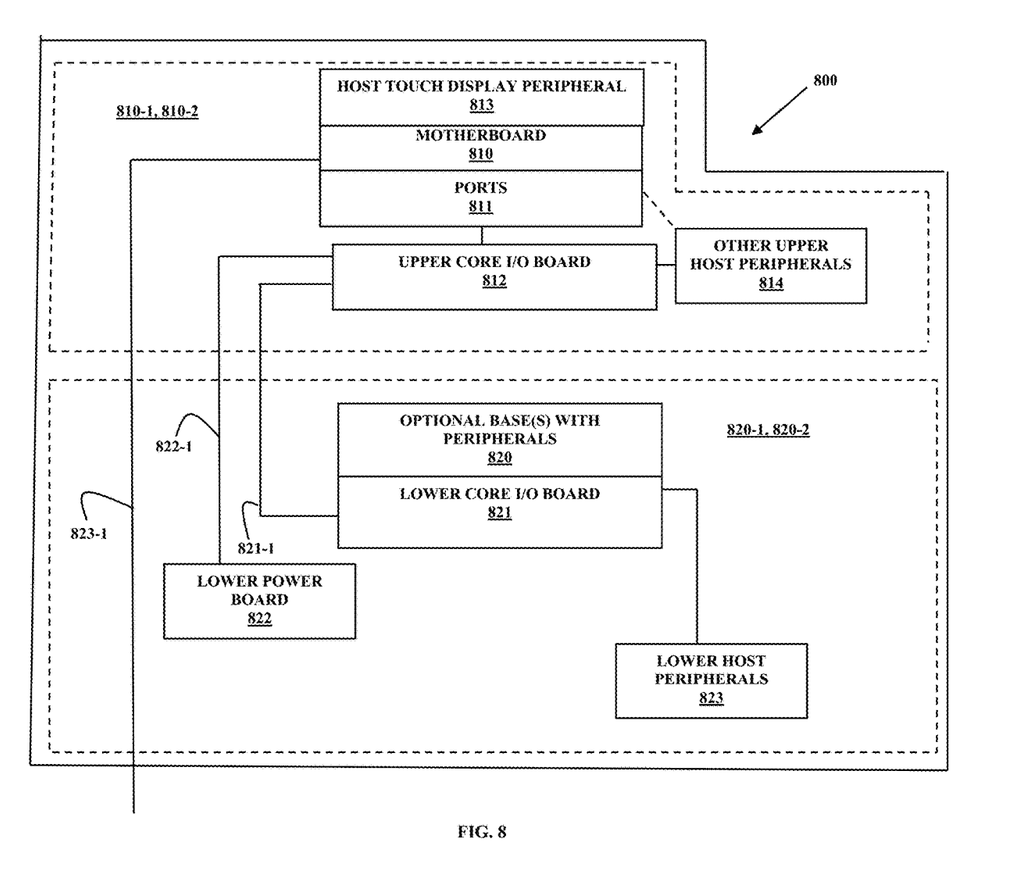
FIG. 8 is a diagram of a system for a modular terminal architecture, according to an example embodiment.

FIG. 8 is a diagram of a system 800 for a modular terminal architecture, according to an example embodiment. It is noted that system 800 is shown in simplified form with only those components necessary for understanding the architecture shown. Thus, more or less components can be provided without departing from the modular terminal architecture presented herein.

System 800 includes a host device 810-1 within a host device housing 810-2 and optional non-host devices 820-1 housed within non-host device housings 820-2. The non-host device 820-1 can be, for example, a pedestal non-host device 820-1 within a pedestal non-host device housing 820-2, as illustrated in FIGS. 2, 4, and 6 or can be a media depository non-host device 820-1 within a media non-host device housing 820-2, as illustrated in FIGS. 3, 5, and 6.

Host device 810-1 includes a motherboard 810, ports 811 to the motherboard 810, upper core I/O board 812 (e.g., also shown in FIG. 7A), host touch display peripheral 813, and other host peripherals 814 (e.g., combined scale and scanner 120, handheld scanner 130, user navigation control 140, and coupon accepter 150). Peripherals 814 are connected directly to ports 811 and/or to ports 711 of upper I/O board 812. Upper I/O board 812 may be located within a backside housing 810-2 of display peripheral 813. It is noted that host-device housing 810-2 may be a composite housing that includes the combined scanner and scale housing, the touch display housing, optional handheld scanner housing, and/or optional combined card reader and keypad 360. In an example embodiment, host-device 810-1 is integrated into the touch display housing, and thus, the touch display peripheral 813, and as such, motherboard 810 is shown in FIG. 8 below host touch display peripheral 813.

Each non-host device 820 is included within its corresponding non-host device housing 820-2. Each non-host device 820 is an optional base composite peripheral 820 to host device 810-1. The optional bases 820 may include a pedestal non-host device 820-1 with attachable/detachable printer peripheral or a media non-host device 820-1 with coin accepter 310, user navigation control 320, coin dispenser 330, coupon accepter 340, currency/note accepter and dispenser 350, combined card reader and PIN pad 360, and receipt printer 370.

Each non-host device 820 includes lower core I/O board 821 (e.g., also shown in FIG. 7B) and a lower power controller board 822. Lower host peripherals 823 can include an attachable and detachable printer for pedestal non-host device 820-1, or alternatively, coin accepter 310, user navigation control 320, coin dispenser 330, coupon accepter 340, cash or currency accepter and dispenser 350, combined card reader and PIN pad 360, and receipt printer 370 for media depository non-host device 820-1.

It is noted that additional peripherals such as near field communication (NFC) transceivers for contactless card reading, LED lights, speakers, microphones, cameras, lane status indicators, tower LED, etc. can be included in either of the two above-discussed non-host devices 820-1. Thus, the embodiments discussed can include these additional peripherals located within the non-host device housings 820-2 for the non-host devices 810-1.

Three cables 821-1, 822-1, and 823-1 are depicted in FIG. 8 as being connected between the non-host device 820-1 and the host device 810-1. A first cable 821-1 is connected between a USB host control port 721 of lower I/O board 821 to a USB type A port 711 of upper I/O board 812. A second cable 822-1 is connected between lower power controller board 822 and a 24 V DIN port 711 of upper I/O board 812. A third cable 823-1 is passed through the non-host device housing and connected to a local area network (LAN) port on the motherboard 810 of the host device 810-1.

In an embodiment, there can be two additional cables connected between a controller and antenna board of the non-host device 820-1 and a corresponding controller and antenna board of the host device 810-1. For example, a controller and antenna board associated with the combined scanner and scale 120 can include its own board on the host device 810-1 and a corresponding controller board on the non-host device 820-1. In this case, two additional cabled connections are made between the two boards. Thus, in example embodiments, no more than 5 total cable wires are needed within the architecture of system 100, with one cable 823-1 being a passthrough LAN cable.

Because of various factors including space limitations within housings 810-2 and 820-2 and I/O processing of host peripherals 814 and lower host peripherals 824; ports on existing I/O boards; and locations of the I/O boards, configuring a modular terminal previously required a technician and an extended period of time before a desired modular terminal was operational at a given retailer site. Previous approaches included two I/O boards in the non-host device housings 820-2 with no I/O board in the host device housing 810-2. In contrast, the approach according to example embodiments of the disclosed technology is an expanded I/O board 812 located in the host device housing 810-2 and a smaller footprint (e.g., mini) I/O board 821 located in each of the two non-host device housings 820-2.

The architecture illustrated in system 100 does not eliminate the space limitations within the housings 810-2 and 820-2, but rather, provides an expanded enhanced host I/O board 812 situated behind display peripheral 813 along with a new I/O board 821 that make any desired configuration of a modular terminal 400 and/or 500 easier to setup with non-skilled personnel despite the aforementioned space limitations. With the enhanced architectures according to embodiments of the disclosed technology, a desired configuration of a modular terminal can now be achieved in minutes rather than hours, which was previously norm in the industry. Other technical benefits of the disclosed technology include integration of the host device 810-1 within the touch display housing for the touch display peripheral 813 as well as the presence of a fewer number of unused ports on the two I/O boards 812 and 821 from what currently exists in the industry. While unused I/O ports are necessary for expansion capabilities, they are also expensive to manufacture and constitute wasted resources when they are not actually being utilized in a given modular terminal configuration.

In an embodiment, modular terminal 400 is a self-service terminal (SST) or a kiosk. In an embodiment, modular terminal 500 is an SST, a point-of-sale (POS) terminal, an automated teller machine (ATM), or a kiosk.

In an embodiment, modular terminal 500 is further configurable to include additional displays. For example, one display for a cashier or teller operating modular terminal 500 and one display for a customer during a transaction.

Figure 9:
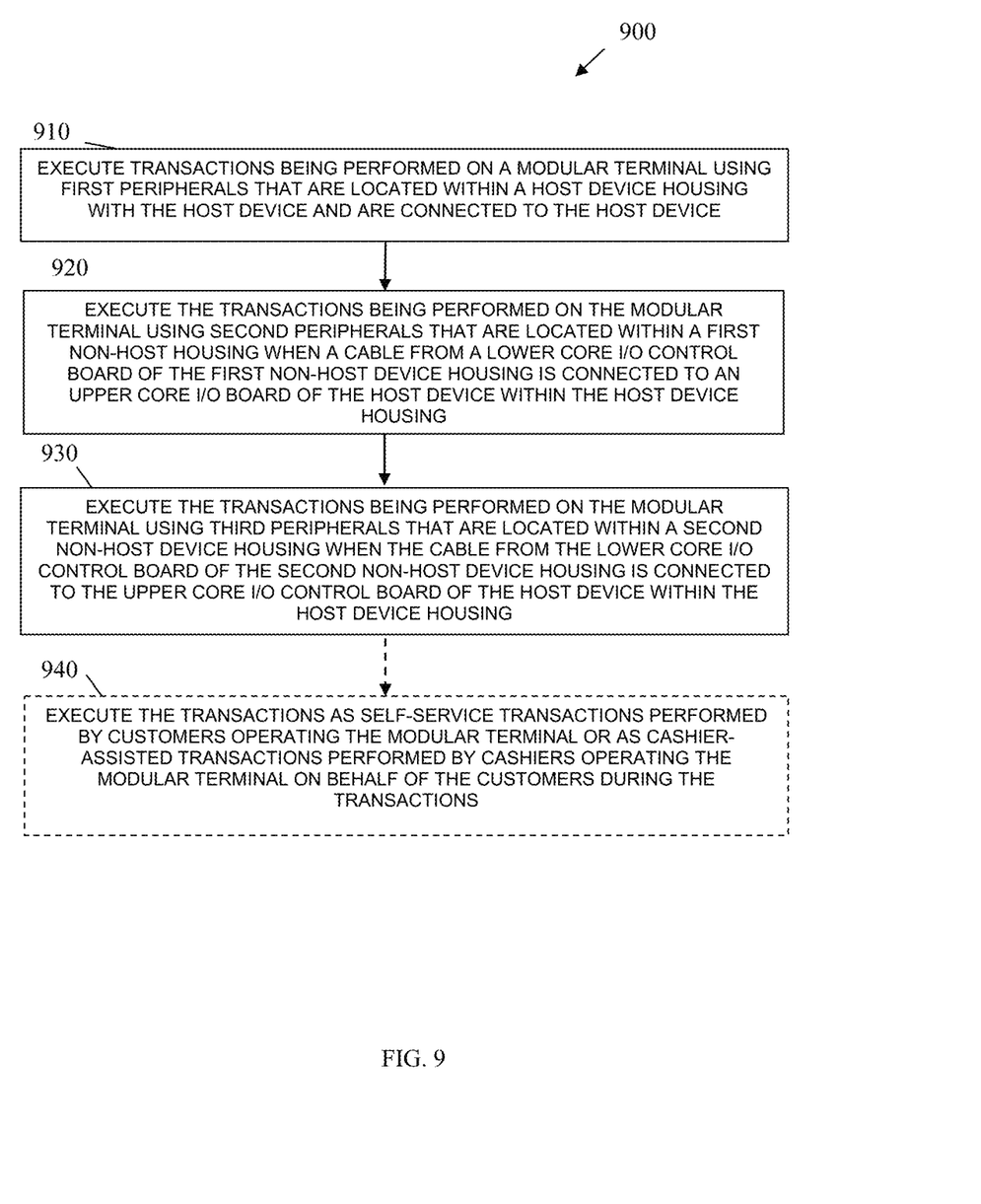
FIG. 9 is a flow diagram of a method of operating a modular terminal architecture, according to an example embodiment.

FIG. 9 is a flow diagram of a method 900 of operating a modular terminal architecture, according to an example embodiment. The method 900 is executed as instructions by a processor of a host device for the modular terminal. When the instructions are executed by the processor, the processor performs operations of the method 900.

In an embodiment, the device that executes the instructions is host device 810-1. Host device 810-1 includes motherboard 810 and motherboard 810 includes at least one processor and a non-transitory computer-readable storage medium, which includes the instructions for the operations. The processor when executing the instructions performs the operations discussed below.

At 910, the host device 810-1 executes transactions being performed on a modular terminal 400 and/or 500. The host device 810-1 uses and controls first peripherals 814 that are located within a host device housing 810-2 with the host device 810-1. The first peripherals 814 are connected to the host device 810-2 via motherboard ports 811 and/or via upper core I/O board 812. In an embodiment, at least one of the first peripherals 814 is touch display 813.

At 920, the host device 810-1 executes the transactions being performed on the modular terminal 400 and/or 500. The host device 810-1 uses second peripherals 824 that are located within a first non-host device housing 820-2 when a cable 821-1 from a lower core I/O control board 821 of the first non-host housing 820-2 is connected to the upper core I/O control board 812 of the host device 810-1 within the host device housing 810-2.

At 930, the host device 810-1 executes the transactions being performed on the modular terminal 400 and/or 500. The host device 810-1 uses third peripherals 824 that are located within a second non-host device housing 820-2 when the cable 821-1 from the lower core I/O control board 821 of the second non-host device housing 820-2 is connected to the upper core I/O control board 812 of the host device 810-1 within the host device housing 810-2.

In an embodiment, at 940, the host device 810-1 executes the transactions as self-service transactions performed by customers operating the modular terminal 400 and/or 500. Alternatively, host device 810-1 executes the transactions as cashier-assisted transactions performed by cashiers operating the modular terminal 400 and/or 500 on behalf of the customers during the transactions.

It should be appreciated that where firmware/software is described in a particular form (such as a component or module) this is merely to aid understanding and is not intended to limit how firmware/software that implements those functions may be architected or structured. For example, modules are illustrated as separate modules, but may be implemented as homogenous code, as individual components, some, but not all of these modules may be combined, or the functions may be implemented in firmware/software structured in any other convenient manner.

Furthermore, although the firmware/software modules are illustrated as executing on one piece of hardware, the firmware/software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A modular terminal, comprising:
a host device encased in a first housing, the host device including a motherboard, motherboard ports, an upper core Input/Output (I/O) control board situated behind a portion of the first housing associated with a backside of a touch display, first ports on the upper core I/O control board, and first peripherals that are connected to one or more of the motherboard ports and the first ports;
a non-host device encased in a second housing, the non-host device including a lower core I/O control board situated behind a portion of the second housing associated with a bottom portion of the second housing, second ports on the lower core I/O control board, and one or more second peripherals connected to the second ports,
wherein the motherboard is configured to execute transactions performed by an operator of the modular terminal using the first peripheral devices and the one or more second peripheral devices when the lower core I/O control board is connected to the upper core I/O control board via a cable within the first and second housings,
wherein the first housing is configured to be attached to the second housing to form a first configuration of the modular terminal, and
wherein the first housing is configured to be detached from the second housing and attached to a third housing of a second non-host device to form a second configuration of the modular terminal.

2. The modular terminal of claim 1, wherein the non-host device is a pedestal non-host device that includes a removably attachable printer peripheral as a corresponding second peripheral.

3. The modular terminal of claim 1 wherein the second non-host device is a media depository non-host device that includes a coin accepter, a user navigation control, a coin dispenser, a coupon accepter, a currency/note accepter and dispenser, a combined card reader and personal identification number (PIN) pad, and a printer as corresponding second peripherals.

4. The modular terminal of claim 1, wherein the first peripherals include a touch display, a coupon accepter, a user navigation control, and a combined scanner and scale.

5. The modular terminal of claim 4, wherein the first peripherals further include a handheld scanner encased in a scanner housing that is adapted to be removably attachable to a first side of the first housing associated with the touch display of the host device, wherein the first peripherals further include a combined card reader and personal identification number (PIN) pad encased in a card reader and key pad housing that is configured to be removably attachable to a second side of the first housing associated with the touch display or to a side of a combined scanner and scale housing for the combined scanner and scale.

6. The modular terminal of claim 1, wherein the first configuration of the modular terminal is configured to be operated as a self-service terminal or kiosk by a customer who is the operator.

7. The modular terminal of claim 1, wherein the second configuration of the modular terminal is configured to be operated as a self-service terminal, an automated teller machine, a kiosk, or a point-of-sale terminal by a customer or a clerk on behalf of the customer, wherein the operator is the customer or the clerk.

8. The modular terminal of claim 1, wherein the non-host device further includes a power controller board configured to be connected to the upper core I/O control board within the first and second housings via a second cable.

9. The modular terminal of claim 8, wherein the non-host device further includes a passthrough local area network (LAN) cable configured to be passed through the second housing into the first housing and connected to a corresponding motherboard LAN port.

10. The modular terminal of claim 1, wherein a total number of the first ports of the upper core I/O control board is greater than a total number of the second ports of the lower core I/O control board.

11. A system, comprising:
a host housing that encases a host device and first peripherals, wherein at least one of the first peripherals is a touch display;
the host device comprises a motherboard and an upper core Input/Output (I/O) control board situated behind a portion of the house housing associated with a backside of the touch display;
a first non-host housing that encases one or more second peripherals and a lower core I/O control board encased within the first non-host housing and situated behind a portion of the second non-host housing associated with a bottom portion of the second non-host housing;
a second non-host housing that encases third peripherals and the lower control I/O board encased within the second non-host housing;
wherein the host housing is configured to be attached to and removed from the first non-host housing and the second non-host housing;
wherein when the host housing is attached to the first non-host housing or the second non-host housing, the lower core I/O control board is connected via a cable from the lower core I/O control board to the upper core I/O control board within a corresponding non-host housing and the host housing;
wherein the host device is configured to execute transactions using the first peripherals when the host housing is unattached to the first non-host housing and unattached to the second non-host housing;
wherein the host device is configured to execute the transactions using the first peripherals and the one or more second peripherals when the host housing is attached to the first non-host housing and the cable is connected between the lower core I/O control board and the upper core I/O control board;
wherein the host device is configured to execute the transactions using the first peripherals and the third peripherals when the host housing is attached to the second non-host housing and the cable is connected between the lower core I/O control board and the upper core I/O control board.

12. The system of claim 11, wherein the upper core I/O control board is situated behind a portion of the host housing associated with a backside of the touch display.

13. The system of claim 12, wherein lower core I/O control board is situated behind a portion of the first non-host housing and a portion of the second non-host housing associated with a bottom portion of the first non-host housing and a bottom portion of the second non-host housing.

14. The system of claim 11, wherein each of the first non-host housing and the second non-host housing includes a power controller board configured to be connected via a second cable to the upper core I/O control board.

15. The system of claim 11, wherein the one or more second peripherals comprise an attachable and a removable printer.

16. The system of claim 11, wherein the third peripherals comprise a combined a coin accepter, a user navigation control, a coin dispenser, a coupon accepter, a currency or note accepter and dispenser, a combined card reader and personal identification number (PIN) pad, and a printer.

17. The system of claim 11, wherein the first peripherals comprise the touch display, a combined scanner and scale, a user navigation control, a coupon accepter, an attachable and detachable handheld scanner, and attachable and detachable combined card reader and key pad.

18. The system of claim 11, wherein the host device is configured to be operated, during the transactions, as a self-service terminal, a point-of-sale terminal, a kiosk, or an automated teller machine.

* * * * *